(12) United States Patent
Simon

(10) Patent No.: US 6,588,644 B2
(45) Date of Patent: Jul. 8, 2003

(54) ENERGY CONTROLLER FOR VIBRATION WELDER

(75) Inventor: William P. Simon, New Milford, CT (US)

(73) Assignee: Soncis & Materials Inc., Newtown, CT (US)

( * ) Notice: Subject to any disclaimer, the term of this patent is extended or adjusted under 35 U.S.C. 154(b) by 0 days.

(21) Appl. No.: 09/881,146

(22) Filed: Jun. 14, 2001

(65) Prior Publication Data

US 2002/0108998 A1 Aug. 15, 2002

Related U.S. Application Data

(60) Provisional application No. 60/212,168, filed on Jun. 16, 2000.

(51) Int. Cl.[7] ............................ B23K 1/06; B23K 13/08; B23K 20/10
(52) U.S. Cl. ............................ 228/1.1; 228/8; 228/110.1
(58) Field of Search ............................ 228/1.1, 7, 8, 9, 228/10, 12, 110.1, 102, 103

(56) References Cited

U.S. PATENT DOCUMENTS

| | | | | |
|---|---|---|---|---|
| 3,791,569 A | * | 2/1974 | Mims | 156/580.1 |
| 4,009,362 A | * | 2/1977 | Becker | 219/92 |
| 4,746,051 A | * | 5/1988 | Peter | 228/1.1 |
| 5,562,242 A | * | 10/1996 | Manzo et al. | 156/580 |
| 5,795,419 A | * | 8/1998 | Lotz et al. | 156/350 |
| 5,968,007 A | * | 10/1999 | Simon et al. | 604/22 |
| 6,033,505 A | * | 3/2000 | Sugiyama et al. | 156/292 |
| 6,280,566 B1 | * | 8/2001 | Naito et al. | 100/918 |
| 6,364,977 B1 | * | 4/2002 | Simon | 156/351 |

* cited by examiner

*Primary Examiner*—Tom Dunn
*Assistant Examiner*—Zidia Pittman

(57) ABSTRACT

An energy controller is described for a vibration welder wherein the energy imparted into work-pieces being vibration welded is derived and compared with an energy set point to control the vibration welding operation. After a vibration welding operation has encountered the energy set point the welding operation is stopped and the quality of a weld derived from a comparison with another parameter associated with the vibration welding. The other parameter can be the amount of movement of one of the work-pieces during vibration welding or the time involved to inject the energy into the work-pieces to achieve the vibration weld.

6 Claims, 3 Drawing Sheets

ENERGY CONTROLLER FOR VIBRATION WELDER

PRIOR APPLICATION

This is a continuation in part of a provisional patent application Serial No. 60/212,168, filed Jun. 16, 2000. All of the specification of this prior application is incorporated herein by reference thereto.

FIELD OF THE INVENTION

This invention relates to vibration welding generally and more specifically to a technique to control vibration welding using the energy imparted to the parts by the vibration welder.

BACKGROUND OF THE INVENTION

In the field of ultrasonic welding of plastic parts it is known to provide various modes of welding. One mode is based upon a time-based cycle wherein the ultrasonic weld is completed after a pre-selected time delay. In another mode a pre-selected load force between the plastic parts is employed. In a constant energy based cycle, the ultrasonic weld cycle continues until a pre-selected amount of energy, such as can be measured in watt-seconds, has been delivered to the plastic components.

Ultrasonic welding of plastic parts involves bringing plastic parts into pressurized contact with each other and while the parts are maintained in a stable physical relationship with each other, bringing an ultrasonic horn into contact with one of the plastic parts to inject ultrasonic energy into a small area immediately below the horn. The amount of ultrasonic energy imparted to the plastic pieces is sufficient to soften or melt the zones in alignment with the horn and thus enable the juxtaposed zones to fuse when the energy from the horn is no longer applied.

Vibration welding equipment generally bonds two plastic parts together by holding one part stationary and vibrating the other part while in contact at the bonding area under an applied force. This produces friction that melts the plastic at the joint area. When allowed to cool, the joint produced can be as strong as the surrounding material.

In vibration welding the plastic parts are pressed together by opposed platens, one of which is moved relative to the other so as to cause the frictional melting of contacting plastic surfaces. After melting, relative motion ceases to thus enable the surfaces to cool and fuse together. In vibration welding extended facing surfaces of the parts can be welded together in a short cycle, while ultrasonic welding of extended surfaces would involve a series of individual, either overlapping or spaced apart, spot welds.

In vibration welding control parameters typically involve either time, i.e. a fixed time period for completing the weld or distance, i.e. enabling the platens to move a fixed distance towards each other during the time that frictional melting under pressure occurs.

Vibration welding has been used for a wide variety of parts, including the automotive industry and supporting area such as engine components, door panels, intake manifolds, spoiler panels, filter housings and medical components. In many of these applications it is extremely critical to produce consistently strong bonds.

When a bond has not been properly produced for some unforeseen reason, it is equally important to identify and remove the suspect component from others that have been produced. Weld parameters of time, distance, pressure, hold time, vibration amplitude and variations of the part composition and its size can all have significant impact on the ability to produce a "good" weld.

SUMMARY OF THE INVENTION

With vibration welding equipment in accordance with the invention, the quality of a vibration weld is controlled by regulating the energy imparted to parts being welded together. This is achieved in accordance with one technique of the invention, by pre-selecting an energy set point and controlling the input power from the vibration welder until that energy set point has been reached during vibration welding.

An advantage of such energy control arises when, during the vibration welding process, an expected distance motion between the platen has not been achieved or has been exceeded. In such case, the vibration weld can be expected to be out of tolerance and a rejection of the part can be done for quality control.

Changes in values of any one of a variety of monitored parameters can indicate a change of the energy imparted to the parts during vibration welding and thus result in a quality control problem. When the correct amount of energy has not been delivered to weld the parts within the right amount of time, this information can be used to qualify a bond and reject the manufactured part or to accept the part.

It is, therefore, an object of the invention to provide a technique and system for monitoring the amount of energy imparted to work pieces in a vibration welder during a vibration welding operation to determine the quality of the vibration weld.

It is a further object of the invention to provide a technique and system for controlling the energy imparted into work pieces during a vibration welding operation.

These and other advantages and objects of the invention can be understood from the following detailed description of a preferred embodiment in accordance with the invention as described in conjunction with the drawings.

DETAILED DESCRIPTION OF THE DRAWINGS

Figure 1:
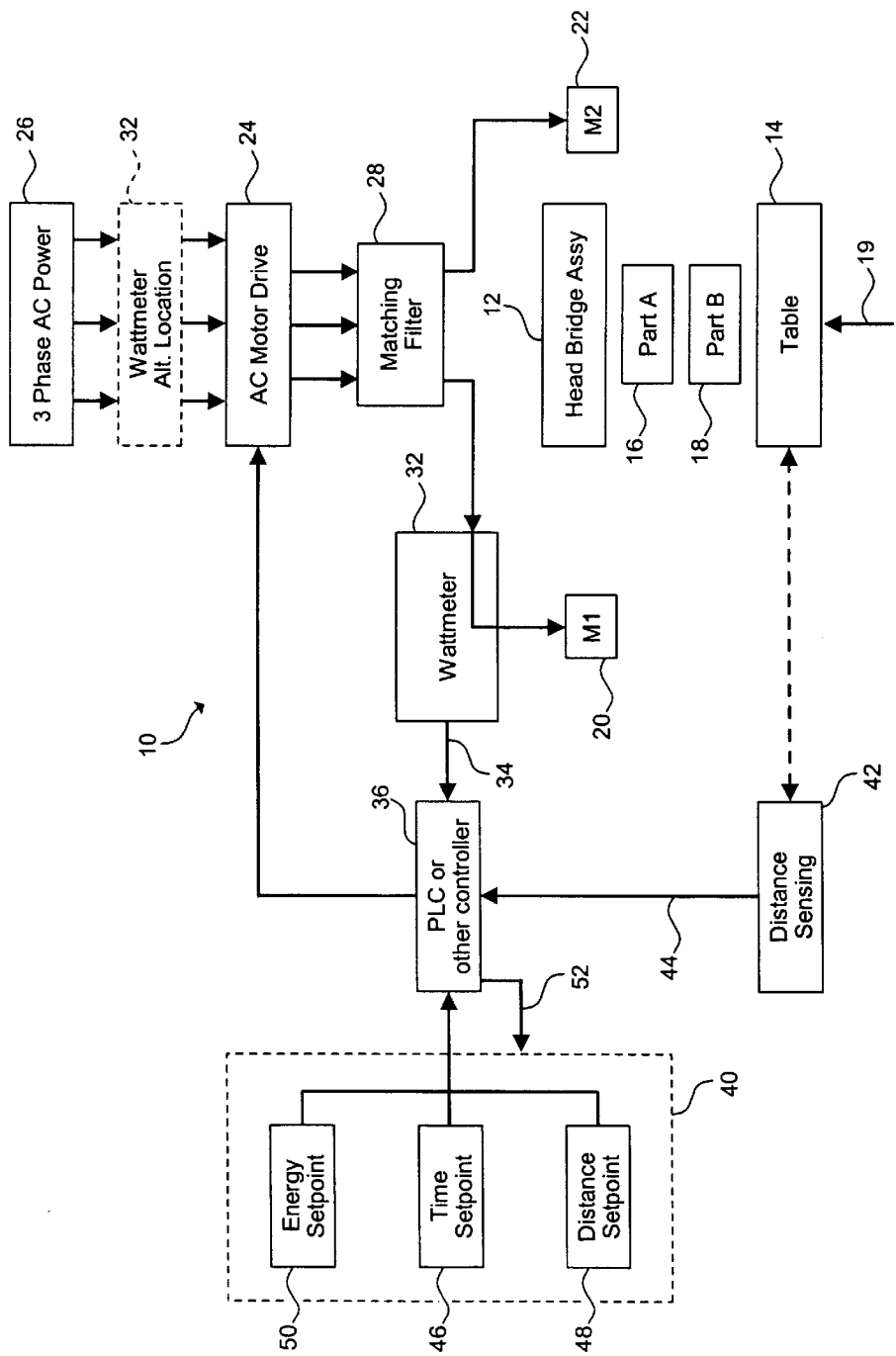
FIG. 1 is a block diagram view of a vibration welder having an energy set point control for a vibration welding operation.

With reference to FIG. 1 a schematic representation of a typical vibration welder is shown at 10. The vibration welder 10 includes a head bridge assembly 12, the upper platen, and a table 14, the lower platen, with work pieces 16 and 18 located between them and supported by the lower platen 14. The table 14 is upwardly movable as suggested with arrow 19 to press the work pieces 16, 18 together. The bridge assembly 12 is laterally movable to cause frictional melting of the contacting surfaces of work pieces 16, 18 to cause them to fuse together. The vibration motion of the head bridge assembly 12 is obtained with two magnets 20 and 22 using two-phase ac power generated by a drive circuit 24. The drive circuit 24 derives its power from a three-phase line source 26 and applies the power to a filter 28 to generate the two-phase power for magnets 20, 22. These illustrated features are representative of well know vibration welders.

In order to control the vibration welding in accordance with the amount of energy imparted to the work pieces, the power to the magnets 20, 22 is monitored and energy is determined by integrating the amount of power consumed over a period of time. In the circuit of FIG. 1 the power is measured by applying a wattmeter 32 to the input power to one of the magnets namely 20. However, other well known techniques can be used to derive an indication of the power being used to move the head bridge assembly or upper platen 12. For example, one could couple a three-phase wattmeter to the path between the line source 26 and motor drive 24 to determine the power supplied to the work pieces 16, 18 during a vibration welding operation.

When the power to a single magnet 20 is monitored by wattmeter 32, it is assumed that the power required to drive the other magnet 22 is about the same so that the total power is double the actual measurement by wattmeter 32. This is typically the case for the drive described and thus simplifies the power measuring equipment because magnet 20 can be a single-phase magnet.

The output from wattmeter 32 is a power signal on a line 34 that is applied to a controller 36, which in turn has an energy control segment 38 as will be described in connection with FIG. 3. Controller 36 can be a suitable industrial controller provided with a control program that includes features needed to operate a conventional vibration welder 10. The program, which controls controller 36, is also known, except for the energy control segment 38 that is the subject of this invention.

One of the operating parameters for vibration welder 10 includes a measurement or a control over the distance the lower platen or table 14 is permitted to travel during a vibration welding operation. For this purpose a distance sensor 42 is used to measure the distance that the table 14 moves towards the upper platen 12 during a vibration welding when the plastic interface between the parts 16 and 18 has been frictionally melted or softened. This measurement for a good weld tends to be very small, typically of the order of 0.010" or so. However, if this is too large, then the system needs to know that as an indication that too much material was melted and the welded parts may be out of tolerance.

Accordingly, distance sensor 42 is used to measure the change in position of the motion of the table or lower platen 14 relative to the upper platen 12 as measured along the direction of travel of the platen 14 after it has pressed the parts 16, 18 together under the force F. Sensor 42 can be made of a variety of well known transducers. The output of sensor 42 is a distance signal on a line 44 that is applied to controller 36. Hence, after a welding operation has begun the controller 36 samples the distance signal on line 44 at a sufficiently frequent basis to enable a control of the vibration welding process.

In the operation of vibration welder 10, a remote computer interface 40, such as a touch screen associated with a pc, is used with which various input parameters can be entered. These parameters include, among others, various set points such for time at 46, distance at 48 and energy at 50. The set point signals are entered into controller 36 to control a vibration welding operation. A vibration welding operation can be controlled by using the time set point 46 or the distance set point or the energy set point or by using a combination of these set points.

For example, when the energy set point 50 controls a vibration welding operation, the controller 36 enters the power measurements made by wattmeter 32 on a sufficiently frequent basis to obtain a measurement of the energy in watt seconds. When the measured watt-seconds have reached the set point level, vibration welding is terminated and the parts allowed to cool.

If, during the welding cycle, the distance measurement exceeded the set point level, or failed to reach a desired minimum then controller 36 generates an error signal by which the vibration-welded parts can be rejected as not having been properly vibration-welded or a quality control signal can be produced for that welded part. Controller 36, therefore, preferably provides a quality control signal on a line 52 to signify the result of the welding operation. This signal can be applied to the interface 40 for display.

Figure 2:
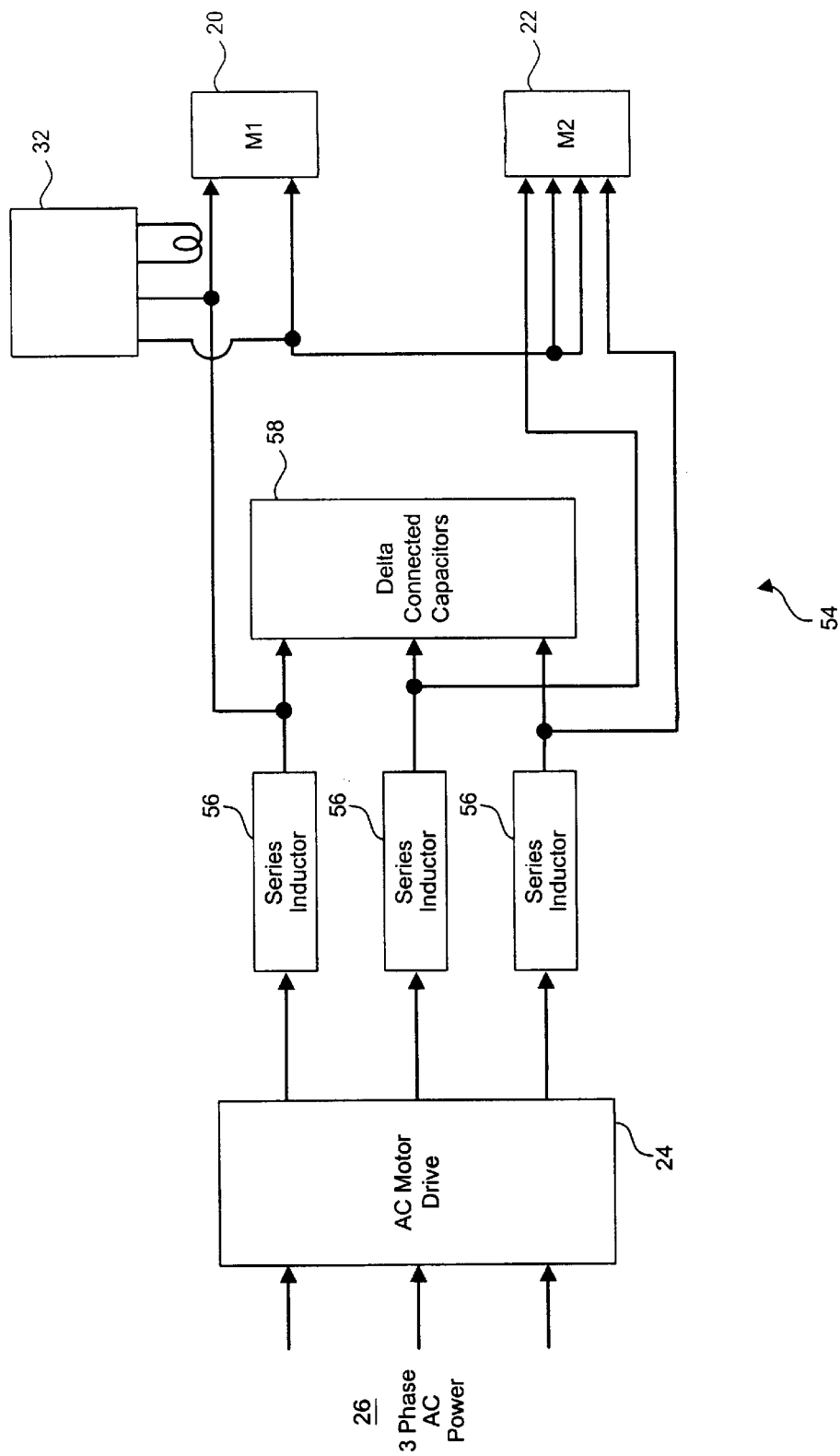
FIG. 2 is a block diagram view of a coupling network used to apply electrical power to the magnets used to vibrate the platen in a vibration welder.

FIG. 2 is a more detailed schematic representation of well-known circuitry 28 used to drive magnets 20, 22. Three-phase power from a line 26 is applied to a three-phase AC motor drive 24. The output power there-from is applied through a filter network 54 formed of series inductors 56 and delta-connected capacitors 58. The outputs from the filter 54 are applied, as shown, to a single phase magnet 20 and a two phase magnet 22.

Figure 3:
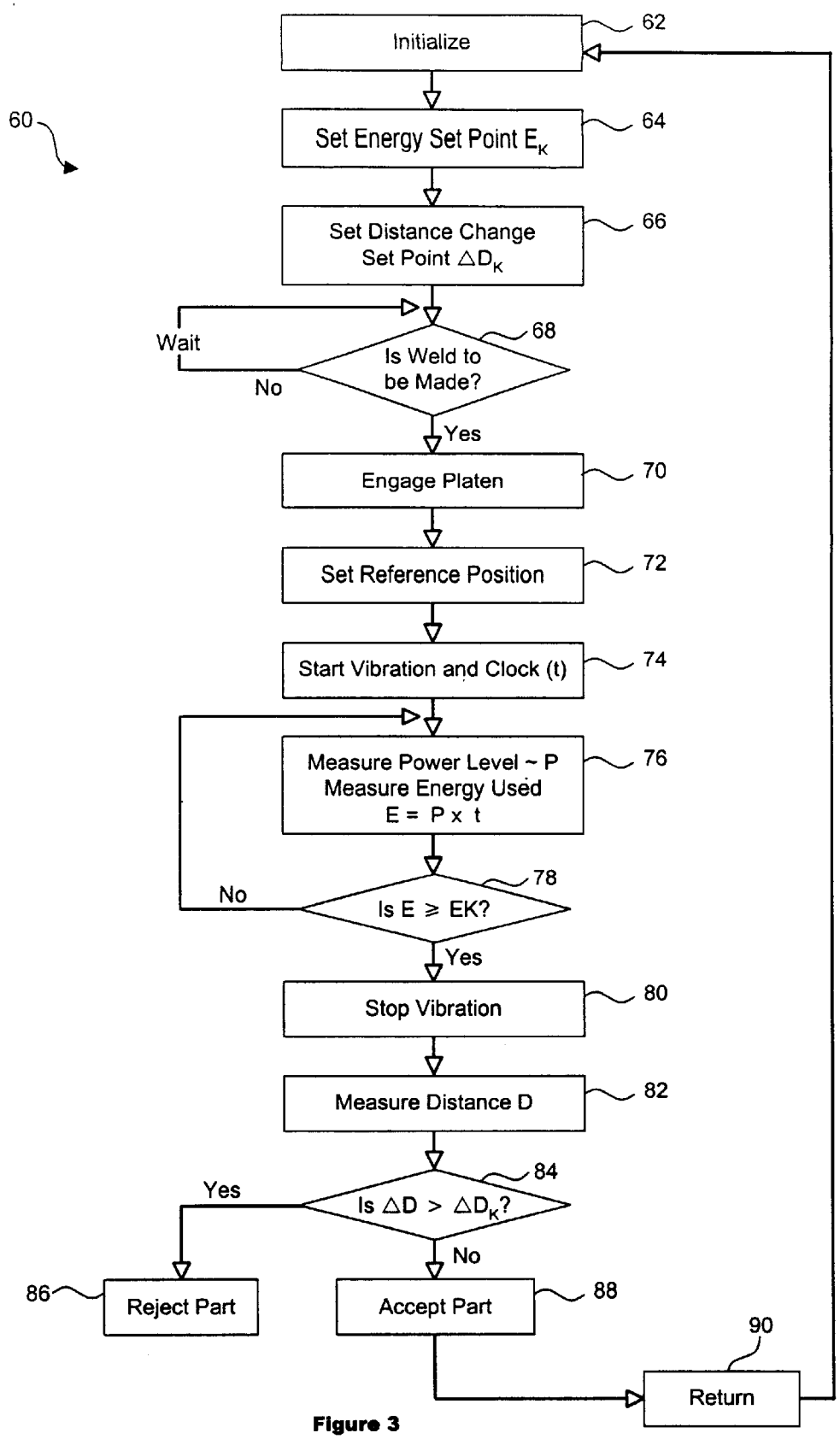
FIG. 3 is a flow diagram of steps for a microprocessor using an energy set point in a vibration welder.

FIG. 3 shows an illustrative flow chart 60 for controller 36 and implements a vibration welding operation of equipment shown in FIGS. 1 and 2. It should be understood, however, that the energy control shown in the flow chart 60 can be applied to other types of vibration welders. At 62 in FIG. 3 the equipment and controller are initialized with appropriate constants and set points for the time or vibration weld duration set point as may be applicable. The energy set point $E_k$ and distance set point $\Delta D_k$ are entered into controller 36 at 64 and 66 respectively. The $\Delta D_k$ set point represents the distance the lower platen 14 may move during a vibration welding operation.

At 68 a test is made whether the set-up is sufficient to commence a start of the welding process. If so, the table 14 is moved at 70 so that the work-pieces 16, 18 can be engaged. At this point a reference position of the table 14 is noted at 72 and stored in controller 36.

The vibration process is then begun at 74 and a clock is started. Power levels employed during the process are measured at 76 and the energy, E, that has been used during the welding operation is determined by the relationship $E=P \times t$. A test is conducted at 78 as to whether the energy E, being injected into the workpieces, has reached the set point level $E_k$. If not, the vibration welding operation continues until test 78 indicates that the energy level has reached the set point value. At this point vibration welding is stopped at 80. A measurement of the distance that table 14 has moved during the welding operation is then made at 82. If table 14 has moved relative to its reference point, as stored at 72, more than the allotted maximum amount, $\Delta D_k$, as tested at 84, the welded part can be rejected at 86. Otherwise, the part is accepted at 88. A return is made at 90.

In this manner the energy can be used as a controlling parameter and determine the duration and quality of a vibration weld. Other parameters can be used in conjunction with the energy measurements. For example, if the time to inject a certain amount of energy into a work piece exceeds a preset time interval, the workpiece could be considered out of tolerance. Empirical measurements can be used to derive a time or weld duration set point level for the maximum and or minimum amount of times for completing a vibration weld.

Having thus described a technique and system to control a vibration weld, the advantages of the invention can be understood. Variations from the described embodiments can be made without departing from the scope of the invention as set forth in the following claims.

What is claimed is:

1. In a vibration welder having a movable platen driven into a vibration mode by magnets actuated from a power supply and wherein a controller is used to regulate the sequence of operations during a vibration welding operation of first and second work pieces, the improvement comprising:

an energy measuring device for producing an energy signal indicative of the energy imparted to the work pieces during a vibration welding thereof, wherein the energy measuring device includes a watt meter coupled to one of the magnets employed to induce vibration welding of the work-pieces to produce a signal indicative of the power delivered to said one magnet;

an energy setpoint signal generator for pre-selecting a desired amount of energy that is to be imparted to the work pieces; and an energy controller responsive to the energy setpoint signal generator and the energy signal for control of the vibration welding of the work pieces.

2. The improved vibration welder as claimed in claim 1 and further including means for selecting a set point value of a parameter used to determine a quality of the vibration welding and produce a signal indicative thereof; and means for measuring the parameter during the time that said vibration welding is under energy control; and means responsive to the measured parameter signal and said parameter set point value for deriving an indication of the quality of the vibration weld of the work-pieces.

3. The improved vibration welder as claimed in claim 2 wherein said parameter is the distance of movement by one of the work pieces towards the other during vibration welding and wherein a distance measuring device measures the movement of one of the work-pieces towards the other during the vibration welding and produces a distance signal indicative thereof.

4. The improved vibration welder as claimed in claim 2 wherein said parameter is the time lapsed during said vibration welding of the work-pieces while under energy control; and means for measuring the time lapsed to complete the vibration welding.

5. In a vibration welder having a movable platen driven into a vibration mode by magnets actuated from a power supply and wherein a controller is used to regulate the sequence of operations during a vibration welding operation of first and second parts, the improvement comprising:

a power sensor effectively coupled to the power supply to generate a power signal indicative of the power being drawn by the magnets while the parts are being vibration welded, wherein the power sensor includes a watt meter coupled to a magnet employed to induce vibration welding of the work-pieces;

an energy measuring device responsive to the power signal for producing an energy signal indicative of the energy imparted to the parts during a vibration welding thereof;

an energy set point signal generator for producing a set point signal indicative of a pre-selected desired amount of energy that is to be imparted to the parts; and an energy controller responsive to the energy set point signal and the energy signal for control of the vibration welding of the parts.

6. The improved vibration welder as claimed in claim 5 wherein two magnets are used to cause said vibration welding; said power sensor being responsive to input power to one of said magnets to produce a power signal indicative of the amount of power used by said two magnets.

* * * * *

UNITED STATES PATENT AND TRADEMARK OFFICE
CERTIFICATE OF CORRECTION

PATENT NO.     : 6,588,644 B2
DATED          : July 8, 2003
INVENTOR(S)    : William P. Simon It is certified that error appears in the above-identified patent and that said Letters Patent is hereby corrected as shown below:

<u>Title page,</u>
Item [73], should read:
-- [73]   Assignee: Sonics & Materials Inc., Newton, CT (US) --

Signed and Sealed this

Eleventh Day of November, 2003

JAMES E. ROGAN
*Director of the United States Patent and Trademark Office*